Aug. 13, 1935.  R. P. PARADISE  2,010,886
PIPE LINE SWIVEL JOINT
Filed July 12, 1933

Inventor,
Raymond P. Paradise,
By
Minturn & Minturn,
Attorneys.

Patented Aug. 13, 1935

2,010,886

UNITED STATES PATENT OFFICE 2,010,886

PIPE LINE SWIVEL JOINT

Raymond P. Paradise, Indianapolis, Ind.

Application July 12, 1933, Serial No. 680,063

3 Claims. (Cl. 285—124)

This invention relates to the art of swivel joints and particularly to a swivel joint in a pipe line which is oscillated from time to time, such for example as in over head irrigation practice where jets or sprays of water are desired to be directed over a wide area of ground. A primary object of my invention is to provide a swivel joint without the customary packing glands and without compression fittings whereby the pipe line may be oscillated without the friction resistance ordinarily set up by the heretofore employed packing means, the joint being self-sealing and requiring no adjustments from time to time as has been the case heretofore when packing glands were employed.

A futher primary object of the invention is to provide a swivel joint not only without compression packing glands but also to provide a joint which will have sufficient bearing area to maintain the relative parts in alignment so that there will not be any binding action set up after use in service. A further important advantage of the invention is that the member employed to prevent leakage may be quickly and readily replaced and may be obtained commercially without undue expense. A still further important advantage of the invention is that this particular member employed to prevent leakage may be removed when worn and replaced by a new one without any particular skill being required. A further advantage of the invention is to be found in the fact that the member employed to prevent leakage automatically stops leakage by reason of pressure in the line being exerted thereagainst, regardless of the pressure employed.

Figure 1:
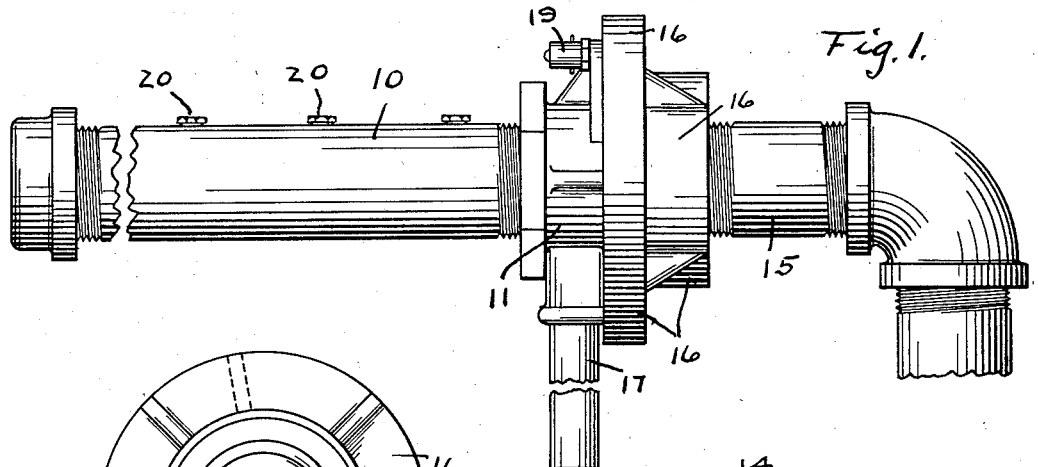
Figure 2:
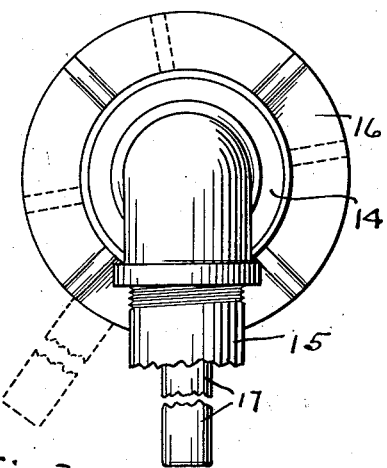
Figure 3:
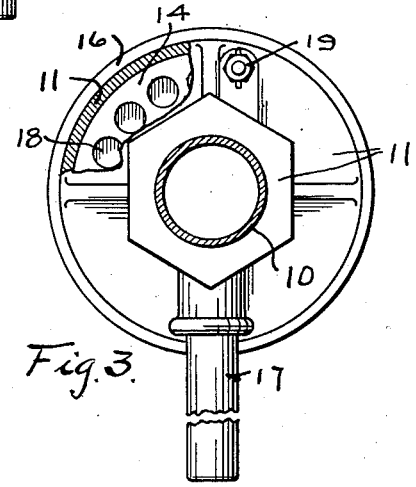
Figure 4:
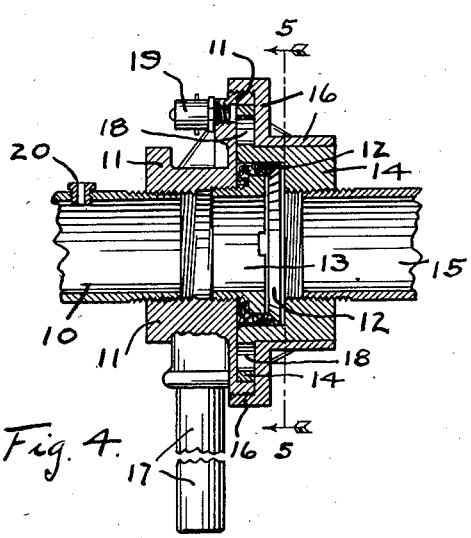

These and other advantages and objects will become apparent to those versed in the art in the following description of one particular form of the invention as illustrated by the accompanying drawing, in which Fig. 1 is a side elevation of a structure embodying my invention;

Fig. 2, an end elevation;

Fig. 3, a fragmentary opposite end elevation;

Fig. 4, a vertical longitudinal section through the device, and

Figure 5:
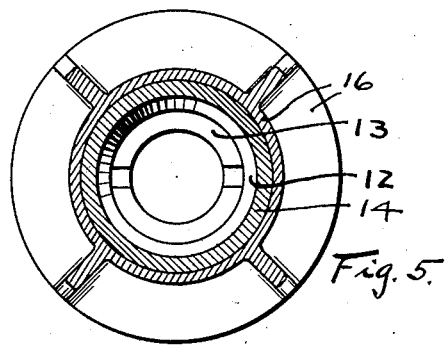

Fig. 5, a transverse vertical section on the line 5—5 in Fig. 4.

Like characters of reference indicate like parts throughout the several views in the drawing.

Referring to the drawing, the line to be oscillated about its longitudinal axis is indicated by the numeral 10, one end of which line is screw-threadedly entered in the bore of a member 11, hereinafter designated as a head. This head 11 is drawn up on the end of the pipe 10 so that when the head 11 is revolved, the pipe 10 is likewise revolved, the two moving in unison. The head 11 is provided with an annularly projecting flange externally screw-threaded.

A cup leather 12 is seated against the outer face of the head 11 concentric with its bore and is secured in place by the sleeve nut 13 which screw-threadedly enters within the bore of the head 11 and preferably has an internal bore itself at least equivalent to that of the bore of the pipe 10. This cup leather 12 has its outwardly extending edge feathered out to leave a sharp edge at its junction with the outer periphery thereof. The outer formation of the cup leather 12 is that employed in ordinary water pumps of commerce and may in fact be obtained commercially on the market, the proportions of my structure being arranged to utilize commercial sizes of the leather.

A fitting 14, hereinafter termed a stationary head as opposed to the shiftable head 11, has a central longitudinal bore therethrough into which is screw-threadedly entered the end of the stationary part of the supply line 15, the stationary head 14 being screwed up on the pipe end sufficiently so as to retain it rigidly, in a fixed position thereon. The face of the head is counter-bored to provide therein a cylinder of short length, at least sufficient to receive therein the cup leather 12 with slight longitudinal clearance thereof. The face of the stationary head 14 is brought up again into sliding contact with the opposing face of the shiftable head 11 to have the periphery of the contacting face of the head 14 slidably engaged within the annular flange above referred to as projecting from the shiftable head 11. The diameter of the cylinder in the stationary head 14 is made to receive the cup leather 12 therein with a sliding fit so that the leather may be free to be revolved therewithin.

The stationary head 14 has a length thereof reduced in diameter as compared to that portion lying within the flange on the head 11 and a retaining nut 16 is slidably fitted over this reduced portion of the head 14 and screw-threadedly engaged about the periphery of the flange on the head 11, Fig. 4, whereby the head 14 is axially aligned centrally of the axis of the head 11 and the parts engaged thereto and also such that the head 11 and the nut 16 then engaged thereto may be revolved freely around the stationary head 14. The rear side of that portion of the head 14 which carries the face that is in contact with the head 11 is of that thickness whereby when the nut 16 is seated against the flange on the head 11, there is sufficient clearance between the head 11 and the nut 16 to permit the oscillation of those parts about the annularly projecting part of the head 14 therebetween to remain stationary and serve as means for preventing the longitudinal movement of the head 11 away from the head 14, the thrust between the supplying line 15 and the distributing line 10 being thus taken by these members. Vertical load is taken on the bearing provided by the horizontally extending portion of the fixed head 14 and the bore of the retaining nut 16 fitting therearound.

The shiftable head 11 is here shown as being provided with a handle 17 extending downwardly therefrom as a means for rotating the head 11 and the pipe line 10 engaging the head. To provide ample means for lubricating the moving parts, particularly where the longitudinal thrust comes, the annularly projecting portion of the stationary head 14 which extends between the shiftable head 11 and the retaining nut 16 is here shown as being provided with a plurality of holes 18 cored therethrough into which grease may be forced through the fitting 19, the grease thus being carried about the bearing surfaces as the head 11 and the retaining nut 16 are shifted around the stationary head 14.

When the water is supplied through the line 15, it is of course free to flow on into the distributing line 10 where it may escape in the usual manner through orifice cups 20 which are screw-threadedly carried in holes in the pipe. Since these cups have orifices therethrough restricted in diameter so as to define the proper size of water jet, the water within the line 10 and therefore also in the line 15 is under pressure and this pressure is communicated to the cup leather 12 tending to force or spread the leather out against the circumferential wall of the cylinder within which it is carried in the stationary head 14. The greater the pressure the tighter this leather is held against the wall. By reason of the leather thus being carried within the cylinder whereby it is subjected to pressure laterally forcing it against the cylinder wall, there is no leakage of water between the periphery of the leather and the cylinder wall. Furthermore since there is considerable peripheral area of the leather in contact with the cylinder wall, the leather will last for a considerable length of time before it needs to be replaced. It is to be seen that as the head and retaining nut 16 are oscillated to shift the pipe line 10, the leather 12 is correspondingly oscillated within its cylinder in the head 14. The sleeve nut 13 is merely employed to hold the leather in place tightly against the end of the head 11. It is thus to be seen that I have provided an exceedingly simple type of swivel connection without the necessity of employing compression type packing glands and that absolutely all leakage of the fluid being conducted through the joint is prevented without interfering with the full freedom of relatively oscillating the parts. Furthermore, by employing the head and flange construction extending laterally beyond the line, side thrust, such as would arise where a fire nozzle or the like may be substituted for the line 10, is taken care of thereby, and all metal to metal moving parts are outside of the stream flow where they are amply lubricated.

While I have herein shown and described my invention in the one best form as now known to me, it is obvious that structural changes may be made without departing from the spirit of the invention and I therefore do not desire to be limited to that precise form beyond the limitations as may be imposed by the following claims.

I claim:

1. In a pipe line swivel connection providing for rotation of one part of the line in relation to a relatively fixed part, a head on the rotative part of the line, a head on the fixed part of the line in juxtaposition with the rotative head, a flange extending annularly from the fixed head and having a face of considerable area slidably abutting the rotative head in a plane normal to the axis of rotation of that head, said fixed head having a counterbore at its flanged end, said rotative head being recessed to receive said flange and providing a peripheral extension over the flange, and a retaining nut engaging the rotative head by said extension to extend therefrom over and around said flange to retain the flange in contact with said head and thence extending with a sliding fit along said fixed head to provide a bearing for radial thrusts, said flange extending radially from the fixed head a distance beyond the rotative and fixed heads to provide a substantial bearing against end thrusts and bending strains, a cup leather packing in the counterbore of the fixed head and a nut holding the packing against the rotative head.

2. In a pipe line swivel connection providing for rotation of one part of the line in relation to a relatively fixed part, a head on the rotative part of the line, a head on the fixed part of the line in juxtaposition with the rotative head, a flange extending annularly from the fixed head and having a face of considerable area slidably abutting the rotative head in a plane normal to the axis of rotation of that head, said rotative head being recessed to receive said flange and providing a peripheral extension over the flange, and a retaining nut engaging the rotative head by said extension to extend therefrom over and around said flange to retain the flange in contact with said head and thence extending with a sliding fit along said fixed head to provide a bearing for radial thrusts, said flange extending radially from the fixed head a distance beyond the rotative and fixed heads to provide a substantial bearing against end thrusts and bending strains, said flange being provided with lubricating passages, and having a fitting discharging into said passages whereby the passages may be filled with a lubricant under pressure.

3. In a pipe line swivel connection providing for rotation of one part of the line in relation to a relatively fixed part, a head to be engaged by the rotative part of the line having an annularly projecting flange providing a radially disposed bearing face at right angles to the axis of rotation of the head, said face being set back within the flange to leave an outer overhanging peripheral flange edge, externally screw-threaded, a head to be engaged by the relatively fixed part of the pipe line, an annular flange extending from the fixed head to abut said rotative head face within said overhanging edge, a retaining nut telescoping over said edge and screw-threadedly engaging therewith, said retaining nut having a face slidably engaging said fixed head flange, a sleeve extending from the retaining nut slidably engaging circumferentially about the fixed head, said fixed head having a counterbore in its end toward the rotative head, and cup leather packing held in said counterbore abutting said rotative head face and having a feathered outwardly extending edge toward said rotative head.

RAYMOND P. PARADISE.